US010304337B2

(12) United States Patent
Ando

(10) Patent No.: US 10,304,337 B2
(45) Date of Patent: May 28, 2019

(54) DRIVE SUPPORT APPARATUS

(71) Applicant: DENSO CORPORATION, Kariya, Aichi-pref. (JP)

(72) Inventor: Motonori Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 92 days.

(21) Appl. No.: 15/373,697

(22) Filed: Dec. 9, 2016

(65) Prior Publication Data

US 2017/0169709 A1 Jun. 15, 2017

(30) Foreign Application Priority Data

Dec. 15, 2015 (JP) ................................ 2015-244541

(51) Int. Cl.
*G08G 1/16* (2006.01)
*B60W 30/00* (2006.01)

(52) U.S. Cl.
CPC ............. *G08G 1/161* (2013.01); *B60W 30/00* (2013.01); *G08G 1/166* (2013.01)

(58) Field of Classification Search
CPC ........ G08G 1/161; G08G 1/166; B60W 30/00
USPC ......................................................... 701/301
See application file for complete search history.

(56) References Cited

U.S. PATENT DOCUMENTS

2002/0135467 A1 9/2002 Koike
2003/0006889 A1 1/2003 Koike
2003/0009275 A1 1/2003 Koike
2007/0109111 A1* 5/2007 Breed .................. B60N 2/2863 340/435
2012/0025965 A1* 2/2012 Mochizuki ............. B60Q 9/008 340/435
2014/0240115 A1* 8/2014 Igarashi ................ B60W 30/08 340/435
2017/0018177 A1* 1/2017 Kurotobi .............. G08G 1/0145

FOREIGN PATENT DOCUMENTS

JP H07-262497 A 10/1995
JP 2000-030199 A 1/2000
JP 2000-276696 A 10/2000
JP 2005-182308 A 7/2005
JP 2005-352607 A 12/2005

(Continued)

*Primary Examiner* — Krishnan Ramesh
(74) *Attorney, Agent, or Firm* — Harness, Dickey & Pierce, P.L.C.

(57) ABSTRACT

A drive support apparatus, including a support processor that sets a support level according to a collision risk determined by a collision possibility determiner, when a traveling road is not determined as a priority road by a travel road information obtainer, and outputs support information. Further, the support processor determines whether a visibility state is good, and determines whether a display state of a signal device is giving a right of way to the self-vehicle, when the traveling road is not determined as a priority road by the travel road information obtainer, and outputs support information. Then, upon having a determination that the visibility state is compromised, or that the display state of the signal device is abstained from giving a right of way to the self-vehicle, the support processor outputs the support information even when the traveling road is a priority road.

12 Claims, 5 Drawing Sheets

(56) References Cited

FOREIGN PATENT DOCUMENTS

| | | | |
|---|---|---|---|
| JP | 2006-182207 | A | 7/2006 |
| JP | 2007-323184 | A | 12/2007 |
| JP | 2008-097413 | A | 4/2008 |
| JP | 2008-126755 | A | 6/2008 |
| JP | 2009-245326 | A | 10/2009 |
| JP | 2012-014219 | A | 1/2012 |
| JP | 2013-134567 | A | 7/2013 |
| JP | 2015-032028 | A | 2/2015 |

* cited by examiner

DRIVE SUPPORT APPARATUS

CROSS REFERENCE TO RELATED APPLICATION

The present application is based on and claims the benefit of priority of Japanese Patent Application No. 2015-244541, filed on Dec. 15, 2015, the disclosure of which is incorporated herein by reference.

TECHNICAL FIELD

The present disclosure generally relates to a drive support apparatus for supporting a drive operation of a driver of a vehicle, especially in view of a collision possibility that is predicted by the apparatus.

BACKGROUND INFORMATION

The vehicle-to-vehicle communication system in recent years has, or allows, each of the vehicles in the system to transmit and receive communication packets in sequence to/from other vehicles in the system for exchanging vehicle information about the travel speed, the current position, the travel direction and the like among a self-vehicle and the other vehicles.

Further, a drive support apparatus used in such vehicle-to-vehicle communication system is devised, or is proposed, to support a drive operation of the vehicle in the system according to a predicted collision possibility between the self-vehicle and the other vehicles in various manners.

For example, in a patent document, JP 2008-126755 A (patent document 1, a drive support apparatus is disclosed that is capable of (i) determining whether a currently-traveled road traveled by the self-vehicle (i.e., a self-vehicle travel road, hereafter) is a priority road over the other road traveled by the other vehicle (i.e., an other vehicle travel road) and (ii) changing basis for calculation of the collision possibility based on a determination result of the priority road.

More practically, when it is determined that the self-vehicle travel road is a priority road over the other vehicle travel road(s), in comparison to a situation when the self-vehicle travel road is determined as a non-priority road, the calculation of the collision possibility is based on a condition that is less likely to predict a collision of the two vehicles.

Then, in case that it is determined that the self-vehicle may collide with a certain other vehicle at a certain intersection, i.e., when the self-vehicle and the other vehicle may have an upon-meeting collision at a certain intersection, information for avoiding such a collision with the certain other vehicle is output as support information.

Note that a priority road in the above context means that, when plural roads are connected to, e.g., intersecting with, each other, the traffic (i.e., a flow of the vehicles) on the priority road is configured to be less obstructed, or more prioritized, than other roads. Further, a non-priority road means that, when a non-priority road is connected to a priority road, the traffic on the non-priority road is less prioritized than priority road. Among the plural connected roads, which one of those roads serves as a priority road is predetermined as a road structure.

According to the drive support apparatus of the patent document 1, when the self-vehicle travels on a priority road, the support information for supporting the self-vehicle is made less noticeable, i.e., is less likely to be output/notified to the driver, than when the self-vehicle travels on a non-priority road.

Note that, when the self-vehicle travels on a priority road, the other vehicle which may have an upon-meeting collision with the self-vehicle is a which traveling on a non-priority road.

According to the drive support apparatus of the patent document 1, when the self-vehicle travels on a priority road, the drive support apparatus is capable of suppressing an output of the support information for notifying the self-vehicle of the other vehicle which is traveling on a non-priority road.

Note that an idea of stricter support information output condition for the self-vehicle on a priority road is based on an assumption that the other vehicle on a non-priority road should be or is expected to decelerate/yield for a vehicle on a priority road, i.e., to perform a collision avoidance behavior, according to a traffic regulation or the like. In other words, the driver of a vehicle on the non-priority road is assumed to act, i.e., to recognize, determine, and operate, in an appropriate manner according to a traffic situation on the priority road.

However, traveling on a priority road does not necessarily mean that the support information regarding the other vehicle on a non-priority road is not needed.

For example, when the visibility of the field around, i.e., of a road in front of, the self-vehicle is bad (i.e., compromised), such as a travel in a foggy night, the driver of the vehicle on a non-priority road may not appropriately recognize the existence of the self-vehicle, which may further lead to an in-appropriate merging operation of the other vehicle from the non-priority road into the self-vehicle travel road, based on a wrong recognition that the traffic on the priority road is sparse and "allowing."

Therefore, in case that the field/environmental visibility is relatively bad, the support information regarding the other vehicle traveling on the non-priority road may preferably be output for the driver of the self-vehicle, even when the self-vehicle travel road is a priority road.

Further, at a signal device equipped intersection, a travel right of the intersection may be given to the vehicle on the non-priority road by a display of the signal. That is, even when the self-vehicle travel road is a priority road, during a time when a travel right of the intersection is not given to the self-vehicle by the signal device, the support information regarding the other vehicle traveling on the non-priority road should be output for the driver of the self-vehicle, in order for him/her to prompt a deceleration/stop operation of the self-vehicle.

That is, whether to output the support information regarding the other vehicle traveling on the non-priority road should be output also depends on a display state of the signal device at an intersection.

SUMMARY

It is an object of the present disclosure to provide a drive support apparatus that is capable of providing support information in an appropriate manner according to a situation of a nearby field.

In an aspect of the present disclosure, a drive support apparatus disposed in a self-vehicle includes a support processor supporting a drive operation of a driver in the self-vehicle by outputting other vehicle information that is obtained from other vehicle via a vehicle-to-vehicle communication, the outputting of the other vehicle information provided in a sensible form for the driver, a self-vehicle positioner identifying a current position of the self-vehicle based on a navigation signal from a navigation satellite of a satellite navigation system, a behavior information obtainer sequentially obtaining a current travel direction of the self-vehicle as behavior information of the self-vehicle, a self-vehicle path specifier specifying a self-vehicle predicted path that is a future travel path of the self-vehicle, based on the current position of the self-vehicle identified by the self-vehicle positioner, and the behavior information obtained by the behavior information obtainer, an other vehicle information obtainer obtaining, via a vehicle-to-vehicle (V2V) communicator performing the vehicle-to-vehicle communication, the other vehicle information including a current position and a travel direction of the other vehicle, an other vehicle path specifier specifying an other vehicle predicted path that is a travel path of the other vehicle in future based on the other vehicle information obtained by the other vehicle information obtainer, a collision possibility determiner determining a collision possibility between the self-vehicle and the other vehicle based on the self-vehicle predicted path specified by the self-vehicle path specifier and the other vehicle predicted path specified by the other vehicle path specifier, a priority road determiner determining whether a self-vehicle travel road traveled by the self-vehicle is a priority road over a connected road that is connected to the self-vehicle travel road based on the current position of the self-vehicle, and a nearby situation obtainer obtaining field information about at least one of a visibility state indicative of visibility of a nearby field from the self-vehicle and a display state of a signal device that controls traffic of a front intersection into which the self-vehicle is going to enter based on an output of an environment recognition device that obtains information about travel environment of the self-vehicle. The support processor determines a support level based on a determination result of the collision possibility determiner, a determination result of the priority road determiner, and the field information obtained by the nearby situation obtainer, and performs a control process according to the determined support level.

In the above configuration, the support processor determines the support level according not only to a determination result of the priority road determiner but also to a situation at the proximity, i.e., of a nearby field, of the self-vehicle having the drive support apparatus. Then, the support processor performs a control process according to the determined support level.

Therefore, according to the above configuration, the output of the support information, i.e., information regarding the other vehicle(s), is not necessarily prohibited even when the self-vehicle travel road is a priority road over the other vehicle travel road. That is, the support information may be output depending on the situation of a nearby field.

Note that the situation of a nearby field in the above context refers to at least one of (i) the visibility of the field around the self-vehicle and (ii) the display state of the signal device of a front intersection into which the self-vehicle is going to enter.

Therefore, according to the above configuration, the drive support information for supporting a drive operation is more appropriately output to the driver of the self-vehicle according to a situation of a nearby field of the self-vehicle.

Note that the same numerals indicate the same components throughout the description of the present application, but in a non-limiting manner, for showing a relationship between the claimed elements and the devices in the embodiments.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiment of the present disclosure is described with reference to the drawings.

Figure 1:
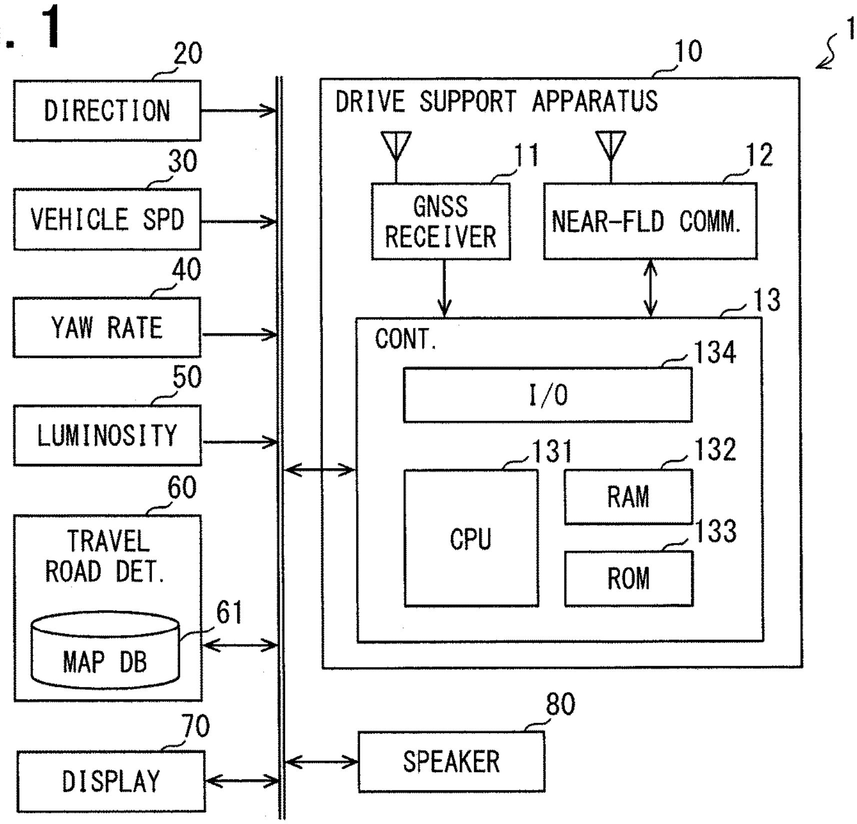
FIG. 1 is a block diagram of an in-vehicle system in one embodiment of the present disclosure.

FIG. 1 is a block diagram of an example of an in-vehicle system 1 serving as a drive support apparatus concerning the present disclosure. The in-vehicle system 1 is disposed in each of plural vehicles traveling on a road.

In the following description, a self-vehicle refers to a vehicle in which a subject in-vehicle system 1 is disposed, and the other vehicle refers to a vehicle other than self-vehicle having the subject in-vehicle system 1.

<Configuration of the In-vehicle System 1>

The in-vehicle system 1 is provided with a drive support apparatus 10, a direction sensor 20, a speed sensor 30, a yaw rate sensor 40, a luminosity sensor 50, a travel road determiner 60, a display 70, and a speaker 80 as shown in FIG. 1.

The drive support apparatus 10 is communicable connected with each of the direction sensor 20, the speed sensor 30, the yaw rate sensor 40, the luminosity sensor 50, the travel road determiner 60, the display 70, and the speaker 80 via a local network (henceforth, Local Area Network (LAN)) installed in the vehicle.

The drive support apparatus 10 is provided with a GNSS receiver 11, a near-field communicator 12, and a controller 13 as components.

The GNSS receiver 11 receives the navigation signal which is transmitted from the navigation satellite of a Global Navigation Satellite System (GNSS) which is a satellite navigation system, and sequentially computes the current position of the vehicle based on the received navigation signal.

The position information indicative of the current position of the vehicle may be represented by latitude, longitude, and altitude, for example. The position information indicative of the current position of the vehicle which is computed by the GNSS receiver 11 is sequentially provided for the controller 13.

The near-field communicator 12 is a communication module for performing vehicle-to-vehicle communication (i.e., vehicle-to-vehicle communication), and for performing communication between the roadside device and the vehicle, and performs communication by using the electric wave of the predetermined frequency bands, e.g., 5.9 GHz bands and 760 MHz bands, with the near-field communication device in other vehicles, and with the roadside device disposed at an intersection, etc.

More specifically, the near-field communicator 12 sequentially provides the data received from the other vehicle or from the roadside device to the controller 13. Also, the near-field communicator 12 transmits the data inputted from the controller 13 at any time or as required.

For example, the near-field communicator 12 receives a communication packet including the vehicle information of the other vehicle while transmitting a communication packet including the vehicle information indicative of the travel state of the self-vehicle. The current position, the travel direction, the vehicle speed, the acceleration, etc, are included in the vehicle information.

The communication packet also includes, other than the vehicle information, a transmission time of the communication packet and information about a sender of the communication packet (i.e., sender information). The sender information is an identification number assigned to a vehicle that is transmitting the vehicle information (i.e., a so-called vehicle ID).

Further, the near-field communicator 12 receives signal device information delivered from the roadside device. The signal device information is information indicative of the present lighted state of the signal device (i.e., a traffic light/signal) that is disposed at an intersection. The delivery of the signal device information sequentially from the roadside device at the intersection is assumed in the above. When the near-field communicator 12 exists in an area of coverage of the roadside device delivering such information of the signal device at a certain intersection, the near-field communicator 12 receives the signal device information. The near-field communicator 12 is equivalent to a vehicle-to-vehicle communicator in the claims.

The controller 13 is implemented as a computer, and is provided with a Central Processing Unit (CPU) 131, a Random-Access Memory (RAM) 132, a Read-Only Memory (ROM) 133, an Input/Output (I/O) 134, and a bus line that connects these components with each other, together with other parts.

The CPU 131 is an electronic circuit module which performs various kinds of data processing, and is realized by using a microprocessor etc.

The RAM 132 is a volatile memory and the ROM 133 is a nonvolatile memory. The program (i.e., a drive support program, henceforth) for operating the well-known computer as the controller 13 and the like are stored in the ROM 133.

The I/O 134 functions as an interface of the controller 13, for the communication with, i.e., for an input/output of data from/to, the GNSS receiver 11, the near-field communicator 12 and the other devices including the sensors that are connected via LAN. The I/O 134 may be implemented by using an analog circuit element, IC, or the like.

The above-mentioned drive support program may be stored in a non-transitory tangible storage medium. The execution of the drive support program by the CPU 131 is equivalent to performing a drive support method that corresponds to the drive support program.

The controller 13 estimates a collision possibility of the self-vehicle and the other vehicle, the latter of which exists in a nearby field of the self-vehicle, i.e., at the proximity of the self-vehicle, based on the data inputted from, for example, the various devices such as the near-field communicator 12, the direction sensor 20 and the like.

Then, based on the result of such estimation, the information for avoiding the collision with the other vehicle is provided for the driver of the self-vehicle, by operating the display 70 and/or the speaker 80 in a certain mode.

Note that the other vehicle in the nearby field of the self-vehicle is a vehicle performing the vehicle-to-vehicle communication with the self-vehicle.

The details of operation of the controller 13 are mentioned later.

The direction sensor 20 is a sensor for detecting an absolute direction of the self-vehicle, for example, which may be a magnetic field sensor or the like.

The speed sensor 30 detects a vehicle speed of the self-vehicle.

The yaw rate sensor 40 detects a rotational angle speed (i.e., a yaw rate) about a vertical axis of the self-vehicle. The yaw rate acting on the self-vehicle may be obtained from the GNSS receiver 11. That is, the GNSS receiver 11 may be used as a yaw rate sensor in the claims.

The luminosity sensor 50 detects luminosity (e.g., illumination) of the nearby field of the self-vehicle.

The drive support apparatus 10 is sequentially provided with the detection result of the direction sensor 20, the speed sensor 30, the yaw rate sensor 40, and the luminosity sensor 50 via LAN.

The travel road determiner 60 is provided with (i) a map database (DB) 61, which is a memory device memorizing road map information, and (ii) a current position detector that is not illustrated.

The current position detector is a device for detecting the current position of the self-vehicle, which may, for example, be realized by using the GNSS receiver etc. Note that the current position information used by the travel road determiner 60 may also be provided from the drive support apparatus 10.

The road map information memorized by the map database 61 is information that indicates road connection relationship, road shapes, and the like, which are represented as a road network made up of links and nodes, i.e., as link information and node information. The node information is information about a node of the road network, which is a connection point of the roads including an intersection.

The node information representing an intersection may be, for example, coordinate information indicative of the position of a subject intersection, and the information about the road connected to the subject intersection. Further, the node information representing an intersection has priority road information indicative of which one of the connected roads that are connected to the subject intersection is a priority road.

Note that a priority road in the above context means that, when plural roads are connected to each other, or are intersecting with each other, the traffic flow (i.e., a flow of the vehicles) on the priority road is configured to be less obstructed, or is more prioritized, than the other roads. Further, the other road other than the priority road, i.e., a non-priority road, means that, when a non-priority road is connected to a priority road, the traffic on the non-priority road is less prioritized than the priority road. Among the plural connected roads to a certain intersection, which one of those roads serves as a priority road is predetermined as a road attribute, or as a road structure. In the following description, a node representing an intersection is designated as an intersection node.

The link information is information about a link that corresponds to a "road", or a road element/segment connecting two nodes, for example. The link information includes lane number information about the number of lanes in the subject road segment.

Note that, in the present embodiment, the priority road information is included in the node information, as an example. However, the priority road information may be included in the link information.

The travel road determiner 60 determines, i.e., identifies, the current position of the self-vehicle on a road map, based on the current position detected by the current position detector. Henceforth, identifying a position of a vehicle on the road map may be designated as a “mapping.” The mapping of the vehicle position may be, for example, performed by using a well-known existing map matching technique, or such method commonly used in the navigation device.

The map matching technique is a technique, which specifies a travel locus of a vehicle based on the travel direction and the vehicle speed of a subject vehicle measured at plural occasions in time, and identifies a current position of the subject vehicle by comparing the travel locus of the subject vehicle and the shape of the roads in the map information.

The travel road determiner 60 sequentially identifies a road that is traveled by the self-vehicle (henceforth, a self-vehicle travel road) based on the result of mapping to the self-vehicle.

Then, the travel road determiner 60 provides the road map information about the above-identified self-vehicle travel road (henceforth, nearby road information) for the drive support apparatus 10 together with the data showing the self-vehicle travel road.

The nearby road information may include the node information about an intersection that exists in the travel direction of the self-vehicle (i.e., a front intersection) and the link information of the connected roads that are connected to the front intersection.

The travel road determiner 60 may be equipped with the above-described functions, and the navigation device, if ever installed, in the self-vehicle may be utilized as the travel road determiner 60.

The display 70 displays various kinds of information based on the instructions from the drive support apparatus 10. The display 70 may be realized, for example, by using a liquid crystal display, an organic electroluminescence display, etc. The display 70 may be arranged at a position viewable from the drivers seat of the self-vehicle. A head-up display (HUD) may be used as the display 70.

The speaker 80 outputs various kinds of sound to the compartment of the self-vehicle based on the instructions from the drive support apparatus 10. The output sound from the speaker 80 includes a voice, a music and the like.

<Function of the Controller 13>

Next, the function of the controller 13 is described with reference to FIG. 2.

Figure 2:
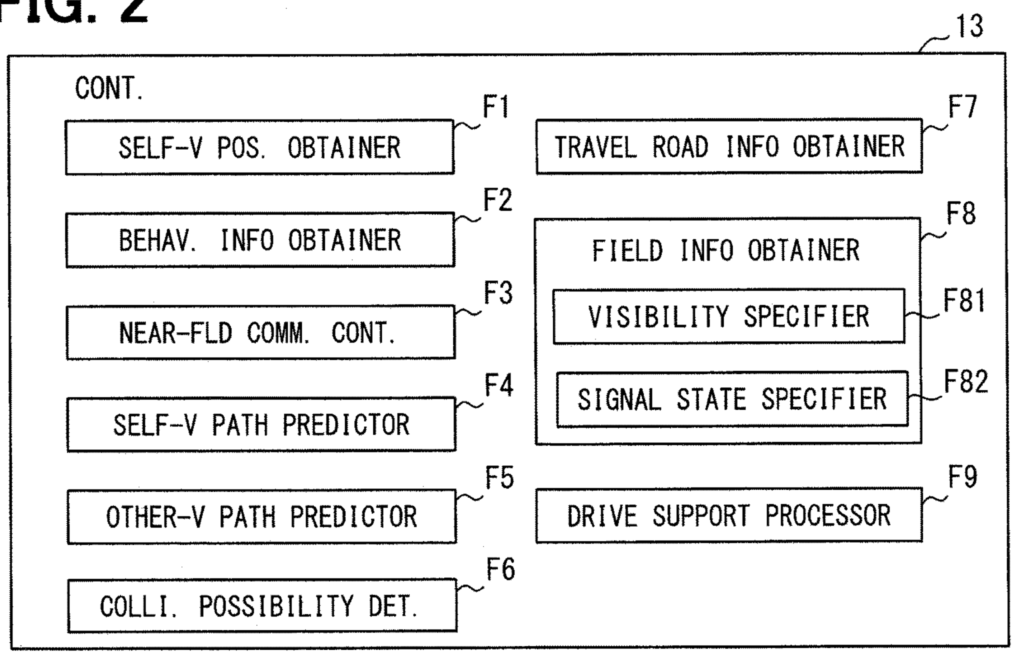
FIG. 2 is a block diagram of a controller of the in-vehicle system.

The controller 13 provides various functions as shown in a block diagram of FIG. 2 by executing the drive support program described above with the CPU 131.

More specifically, the controller 13 is provided with a self-vehicle positioner F1, a behavior information obtainer F2, a near-field communication controller F3, a self-vehicle path specifier F4, an other vehicle path specifier F5, a collision possibility determiner F6, a travel road information obtainer F7, a nearby situation obtainer F8, and a support processor F9 respectively as a function block.

Some or all of the function blocks of the controller 13 may be realized hardware by using one or more Integrated Circuits (IC)s.

Some or all of the function blocks of the controller 13 may be realized as a combination of an execution of software by CPU and a hardware component.

The self-vehicle positioner F1 obtains the current position of the self-vehicle from the GNSS receiver 11. The self-vehicle positioner F1 may perform a position estimation process, i.e., so-called dead reckoning, for estimating the current position by using the detection result of the direction sensor 20, the speed sensor 30 and the like.

The position information indicative of the current position of the self-vehicle may also be obtained from the travel road determiner 60. The self-vehicle positioner F1 is equivalent to a self-vehicle positioner in the claims.

The behavior information obtainer F2 obtains behavior information indicative of the behavior of the self-vehicle from the various sensors, e.g., from the direction sensor 20, the speed sensor 30, the yaw rate sensor 40 and the like. That is, the behavior information obtainer F2 obtains the travel direction, the vehicle speed, and the yaw rate as the behavior information of the present moment.

Note that information included in the behavior information is not necessarily limited to the above. That is, for example, an operation state of a blinker, a shift position of a transmission gear, a depression amount of a brake pedal, a depression amount of an accelerator pedal and the like may also be the behavior information.

The self-vehicle path specifier F3 specifies a self-vehicle predicted path indicative of a future travel path of the self-vehicle. Here, as an example, a half-line extending in the travel direction of the self-vehicle is adopted by the self-vehicle path specifier F3 as a self-vehicle predicted path that starts from a start point, i.e., from the current position obtained by the self-vehicle positioner F1. The data showing the self-vehicle predicted path is designated as self-vehicle predicted path data. The self-vehicle predicted path data may be data that shows (i) a half line with an attribute of position information about a start point of the half-line, an extending direction of the half-line, and the like.

The self-vehicle predicted path may be a line starting from the current position with a predetermined length of extension along the travel direction of the self-vehicle. The length of the self-vehicle predicted path may correspond to the current vehicle speed, which may increase as the vehicle speed becomes high. For example, the length of the self-vehicle predicted path may be defined as a value which is a product of the current vehicle speed multiplied by a preset number of seconds, e.g., 60 seconds.

The near-filed communication controller F3 obtains the data that is received by the near-field communicator 12 while generating the data for the transmission to the other vehicle etc. and making the data transmitted from the near-field communicator 12. That is, the near-filed communication controller F3 controls an operation of the near-field communicator 12.

For example, based on (i) the current position of the self-vehicle obtained by the self-vehicle positioner F1 and (ii) the behavior information obtained by the behavior information obtainer F2, the near-filed communication controller F3 sequentially generates the vehicle information of the self-vehicle (henceforth, self-vehicle information), and outputs the self-vehicle information to the near-field communicator 12.

Thereby, the near-field communicator 12 sequentially transmits the communication packet indicative of the self-vehicle information to the nearby field of the self-vehicle.

The transmission interval of the communication packet indicative of the self-vehicle information may be appropriately designed, for example, as 100 milliseconds.

The near-filed communication controller F3 obtains, from the near-field communicator 12, the vehicle information of the other vehicle (henceforth, other vehicle information)

which is transmitted from the other vehicle and is received by the near-field communicator 12.

The near-filed communication controller F3 stores the received vehicle information of the other vehicle in the RAM 132 after associating the received vehicle information with the vehicle ID of a sender vehicle. In such manner, the near-field communication controller F3 manages the information about the other vehicles around the self-vehicle in a categorized manner for each of the other vehicles.

The near-filed communication controller F3 is equivalent to an "other vehicle information obtainer" in the claims for obtaining the other vehicle information.

In the present embodiment, as an example, the near-filed communication controller F3 includes, i.e., puts, the self-vehicle predicted path data specified by the self-vehicle path specifier F3 in the self-vehicle information. Further, in addition to the above, the other vehicle information transmitted from the other vehicle includes the future travel path of the other vehicle (henceforth, an other vehicle predicted path).

Note that the vehicle information does not necessarily include the predicted path data/information. That is, the self-vehicle information in other embodiments needs not include the self-vehicle predicted path data, and the other vehicle information in other embodiments needs not include the other vehicle predicted path data.

Further, the near-filed communication controller F3 obtains the signal device information that has been transmitted from the roadside device and has been received by the near-field communicator 12.

The signal device information is information indicative of the current display state of the signal device disposed at an intersection as described above. The signal device information functions as the information that indicates which one of the connected links that are connected to an intersection has a traffic priority, i.e., a vehicle on that priority connected link has a priority, a right of way, or a travel right, to pass through or cross the intersection. That is, a travel right/right of way allows a vehicle to pass through or cross, i.e., enter into and exit from, an intersection, legitimately. The signal device information may preferably represent a road-specific travel right or right of way (i.e., a link-specific travel right) that is specifically assigned to each of the roads (i.e., each of the links). Further, the travel right or right of way may be divided into fine-tuned, i.e., more specific, travel rights, such as a pass-through/straight travel right/right of way, a right-turn travel right/right of way, a left-turn travel right/right of way, and the like, according to the traffic mode/type of the intersection.

The communication packet indicative of the signal device information also includes information about which one of the signal devices the signal device information is representing. Thereby, the near-filed communication controller F3 is enabled to store the received signal device information in a distinguishing manner for each of many intersections in the RAM 132.

The other vehicle path specifier F5 specifies, with reference to the other vehicle information obtained by the near-filed communication controller F3, the other vehicle predicted path of the other vehicle that is performing the vehicle-to-vehicle communication with the self-vehicle.

Note that, when the data showing the other vehicle predicted path is not included in the other vehicle information, the other vehicle predicted path may be specified based on the current position and the travel direction which are shown in the other vehicle information by using the same technique of the self-vehicle path specifier F3.

The collision possibility determiner F6 estimates a collision of the self-vehicle and the other vehicle traveling around the self-vehicle, based on the current position of the self-vehicle, the behavior information of the self-vehicle, and the other vehicle information that is obtained by the near-filed communication controller F3. Detailed operations of the collision possibility determiner F6 are mentioned later.

The travel road information obtainer F7 obtains the nearby road information and the data showing the self-vehicle travel road from the travel road determiner 60. As mentioned above, the nearby road information includes the node information about an intersection in the travel direction of the self-vehicle and the link information about each of the connected roads to such intersection.

Based on the current position of the self-vehicle identified by the self-vehicle positioner F1 and the travel direction of the self-vehicle obtained by the behavior information obtainer F2 and with reference to the nearby road information, the travel road information obtainer F7 identifies a closest intersection in front of the self-vehicle, i.e., the first intersection in the travel direction of the self-vehicle. The first intersection may also be designated as a front intersection in the following description.

Then, the travel road information obtainer F7 determines, regarding the front intersection, whether the self-vehicle travel road is a priority road over the other roads, i.e., over the other connected roads connected to the front intersection, or is a non-priority road. How to determine whether the self-vehicle travel road is a priority road is described later.

The travel road information obtainer F7 determining whether the self-vehicle travel road is a priority road or not is equivalent to a priority road determiner in the claims.

The nearby situation obtainer F8 obtains nearby situation information representing a situation of a nearby field around the self-vehicle based on the output of a certain environment recognition device that is configured to obtain the information about the travel environment of the self-vehicle.

The nearby situation information described above may include a visibility of the driver of the self-vehicle in terms of his/her view of the nearby field of the self-vehicle, and the display state of the signal device at the front intersection.

The nearby situation obtainer F8 includes, as components included therein, a visibility specifier F81 and a signal state specifier F82.

The visibility specifier F81 determines, i.e., specifies or defines, whether the visibility of the driver is high, based on the detection result of the luminosity sensor 50. For example, when the luminosity detected by the luminosity sensor 50 is equal to or greater than a preset threshold, the visibility specifier F81 determines that the visibility of the driver is high (i.e., the driver has a good/clear view of the nearby field), and when the luminosity detected by the luminosity sensor 50 is less than the preset threshold, the visibility specifier F81 determines that the visibility of the driver is low (i.e., the driver does not have a good/clear view of the nearby field).

The preset threshold of the visibility may be, for example, set to a value that yields a determination that the visibility at night is low while determining that the visibility during daytime is high. Further, a luminosity of a daytime of the cloudy weather may also be considered as having a certain visibility.

The determination result of the visibility specifier F81 may be stored in the RAM 132 for a certain period of time, and may later be used by the support processor F9 or other component.

Note that information regarding an "index" (i.e., index information) of the visibility, i.e., how high or low the current visibility, is not limited to the detection value of the luminosity sensor 50.

For example, the visibility specifier F81 may determine whether the visibility is high or low, based on the brightness of the captured image taken by the in-vehicle camera configured to capture the image of the nearby field, which is not illustrated. More specifically, based on the brightness information from each of the pixels in the captured image, a representative brightness value may be identified for the captured image. The representative value may be an average, a median or the like of the brightness of all pixels in the captured image. Based on the representative value, the visibility of the nearby field may be determined as high when the representative value is equal to or greater than the threshold, or determined as low when the representative value is less than the threshold.

The visibility specifier F81 may also determine whether the visibility is high or low, based on the state of lighting of a headlight, a fog lamp, or the like.

That is, when none of the headlight, the fog lamp or the like is lighting the nearby field, the visibility may be determined as high, and when at least one of the headlight, the fog lamp or the like is lighting the nearby field, the visibility may be determined as low.

In addition, in view of time information, when the current time falls in a night-time category, the visibility may be determined as low, and when the current time falls in a day-time category, the visibility may be determined as high.

Further, weather information may be utilized, determining that the visibility is high when rain/snow etc. is falling. The weather information may be detected by using a rain sensor in the self-vehicle, or may be obtained via communication from a weather center outside of the self-vehicle.

The luminosity sensor 50 and a camera capturing an inside/outside of the self-vehicle, a headlight sensor for detecting a lighting state of the headlight, a foglamp sensor for detecting a lighting state of the fog lamp, the rain sensor, a communication device receiving the weather information from outside of the self-vehicle are equivalent to a visibility specifier in the claims. The above-mentioned devices may be used in combination.

The signal state specifier F82 determines, i.e., specifies, the display state of the signal device of the front intersection, based on the signal device information obtained by the near-filed communication controller F3, and determines whether the travel right of the front intersection is given to the self-vehicle. The determination result of the signal state specifier F82 is stored for a certain period of time in the RAM 132, and may later be used by the support processor F9 or the like.

Note that a source of information that is used by the signal state specifier F82 to determine whether the travel right of the front intersection is given to the self-vehicle is not limited to the near-filed communication controller F3 or to the roadside device.

In other embodiments, the in-vehicle system 1 may use a front camera for capturing a front image of the self-vehicle, if ever installed therein, for determining whether the travel right of the front intersection is given to the self-vehicle based on the front image captured by the front camera after performing an image recognition process for the captured image.

More practically, an image recognition process such as a pattern matching may be performed first on the front camera captured image, for detecting the signal device in the captured image. Then, by analyzing the pixel recognized as the signal device, the display state of the signal device is specified, i.e., determined, and whether the travel right is given to the self-vehicle may be determined.

For example, when the captured and analyzed image of the signal device is determined as having the display state of a specific color, such as a GO sign color of blue in Japan, it may be determined that the travel right of the front intersection is given to the self-vehicle. Further, when the signal device is determined as having the display state of the other color, such as a STOP sign color of red in Japan, it may be determined that the travel right of the front intersection is NOT given (i.e., abstained from being given) to the self-vehicle.

Note that, in Japan for example, the signal device uses not only a color sign, but also an arrow sign for showing a specific turn direction at the intersection, which may also be considered as the display state of the signal device in the context of the present description.

The near-field communicator 12 and the front camera are equivalent to a signal state specifier in the claims. Note that the display state of the signal device may be determined based on a combination of the signal device information received by the near-field communicator 12 and the recognition result to the captured image of the front camera.

The support processor F9 determines a support level based on (i) the determination result of the collision possibility determiner F6, (ii) whether the self-vehicle travel road is a priority road, (iii) whether the visibility is high or low, and (iv) whether the travel right is given to the self-vehicle.

The support level is a parameter for determining control contents that are provided for the driver as a support control, i.e., as a drive support. The support level is configured as multiple levels of control, including a no support level in which no drive support is provided for the driver. The determination procedure of the support level is mentioned later.

Then, the support processor F9 performs a control process according to the determined support level.

For example, when the determined support level is a level in which an existence of the other vehicle should be reported to the driver, a drive operation of the driver is supported by such an operation, e.g., by outputting information about the existence of the other vehicle from the display 70 or from the speaker 80 in an appropriate manner.

Here, based on an assumption that there are four support levels set for supporting the driver, the contents of the support in each of those levels are described as an example. Note that the level 1 is a lowest support level among four support levels and the level 4 is a highest.

When the support level is determined as the lowest level 1, no support information is output.

In the support level 2, an image indicative of the existence of the other vehicle is displayed on the display 70.

In the support level 3, an image for drawing a driver's attention to an upon-meeting collision at the front intersection is displayed on the display 70. In addition, a reminding sound reminding the collision may be output from the speaker 80.

In the highest support level 4, a risk of possibly-colliding with other vehicle is notified/reported to the driver visually and audibly, by displaying on the display 70 a warning image for warning the driver of the existence of the other vehicle that may be colliding with the self-vehicle, together with an output of a warning sound from the speaker 80. In other words, the support level 4 uses both of the sight and the hearing of the driver for warning the risk of the self-vehicle colliding with the other vehicle.

In other words, the level 2 support provides the support information indicative of the existence of the other vehicle as reference information to the driver, and the level 3 support provides the information about the existence of the risk of colliding with the other vehicle as a stronger appeal to the driver of the self-vehicle, in comparison to the level 2 support. Further, the level 4 support provides the same information as a yet stronger appeal to the driver, in comparison to the level 3 support.

The level 1 is equivalent to an information non-provision level in the claims, the level 2 is equivalent to an information provision level in the claims, the level 3 is equivalent to an attention calling level in the claims, and the level 4 is equivalent to a warning level in the claims. The number of levels and the contents of those levels are not limited to the above. The support levels may be five levels or more, or two or three levels.

Further, the information providing device for providing the above-described information to the driver of the self-vehicle is not limited to the above, i.e., is not limited to the display 70 and the speaker 80. That is, an indicator implemented by using an light emitting diode (LED), a vibrator, and the like may also be used as the information providing device.

<Drive Support Process>

Next, the drive support process that is performed by the controller 13 is described with reference to a flowchart shown in FIG. 3.

The drive support process here refers to a series of processes for notifying the driver in the self-vehicle of the information (i.e., support information) about the other vehicle with which the subject vehicle is performing the vehicle-to-vehicle communication.

Figure 3:
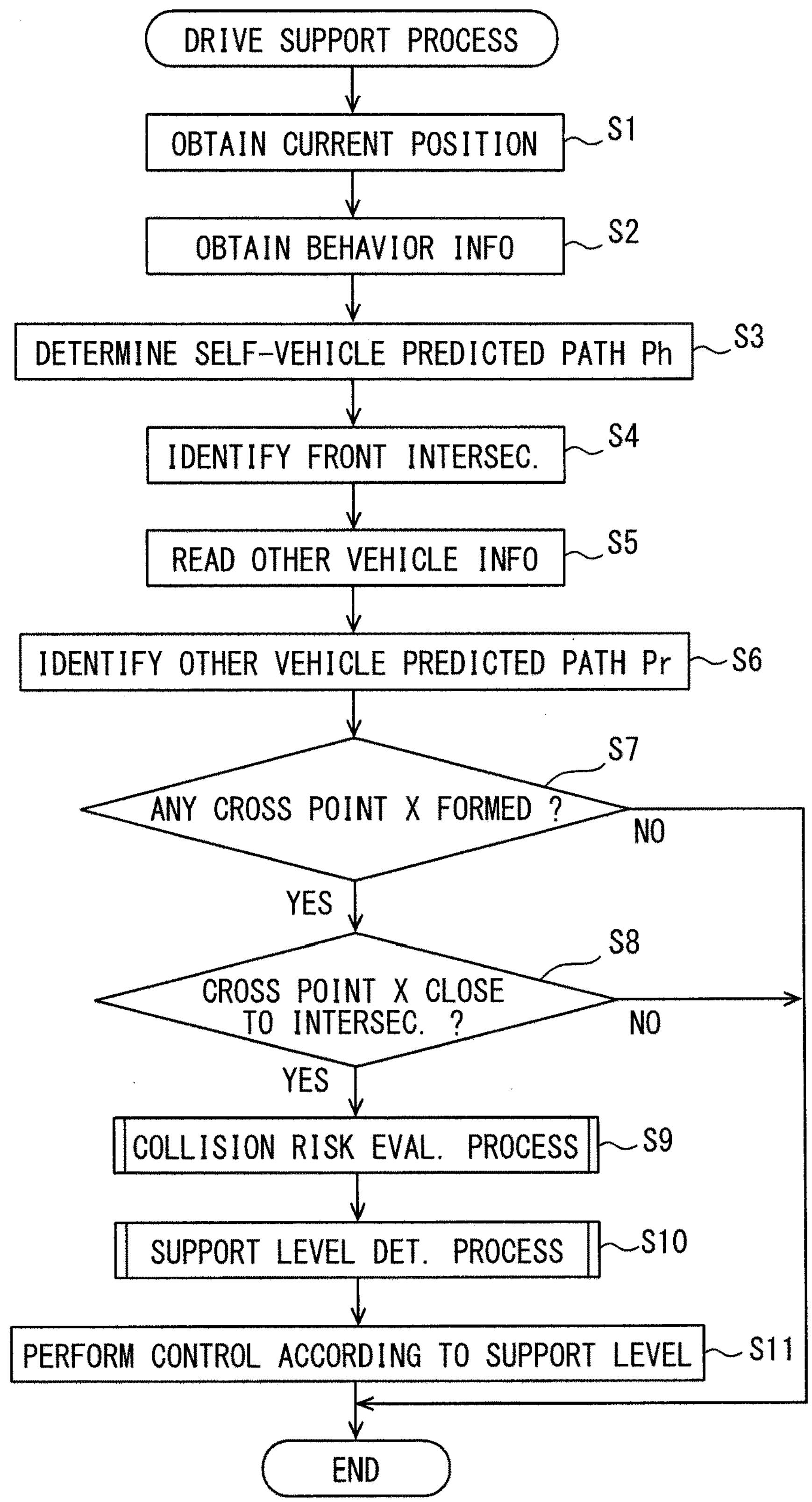
FIG. 3 is a flowchart of a drive support process performed by the controller.

The flowchart shown in FIG. 3 may be periodically/repeatedly performed, for example, while an electric power is supplied to the drive support apparatus 10 (e.g., at an interval of 100 milliseconds).

When two or more other vehicles are performing the vehicle-to-vehicle communication with the self-vehicle, the process may be performed separately for each of the two or more vehicles. Hereafter, the other vehicle serving as an object of the flowcharted process may also be designated as an object vehicle.

Note that, separately from the drive support process mentioned above, there are other processes being performed, such as an other vehicle information obtain process by the near-filed communication controller F3, an identification process of a front intersection by the travel road information obtainer F7, a specification process of a situation of a nearby field by the nearby situation obtainer F8, and the like.

First, in Step S1, the self-vehicle positioner F1 identifies the current position of the self-vehicle, and the process proceeds to Step S2.

The current position of the self-vehicle may be considered as position information provided by the GNSS receiver 11 without any change made thereto, or position information that is corrected based on detection values of the direction sensor 20, the speed sensor 30 and the like.

In Step S2, the behavior information obtainer F2 obtains the behavior information of the self-vehicle, and the process proceeds to Step S3.

In Step S3, the self-vehicle path specifier F3 specifies the self-vehicle predicted path by using the current position of the self-vehicle specified in Step S1, and the travel direction of the self-vehicle obtained in Step S2, and the process proceeds to Step S4.

In Step S4, the travel road information obtainer F7 collaborates with the travel road determiner 60, and determines the front intersection, and the process proceeds to Step S5.

In Step S5, the other vehicle path specifier F5 reads the other vehicle information of the object vehicle from the RAM 132, and the process proceeds to Step S6. In Step S6, based on the other vehicle information read in Step S5, the other vehicle path specifier F5 specifies the other vehicle predicted path, and the process proceeds to Step S7.

Note that, when no other vehicle predicted path data is included in the other vehicle information, the other vehicle predicted path may be specified based on the current position, the travel direction, the vehicle speed and the like included in the other vehicle information.

Figure 4:
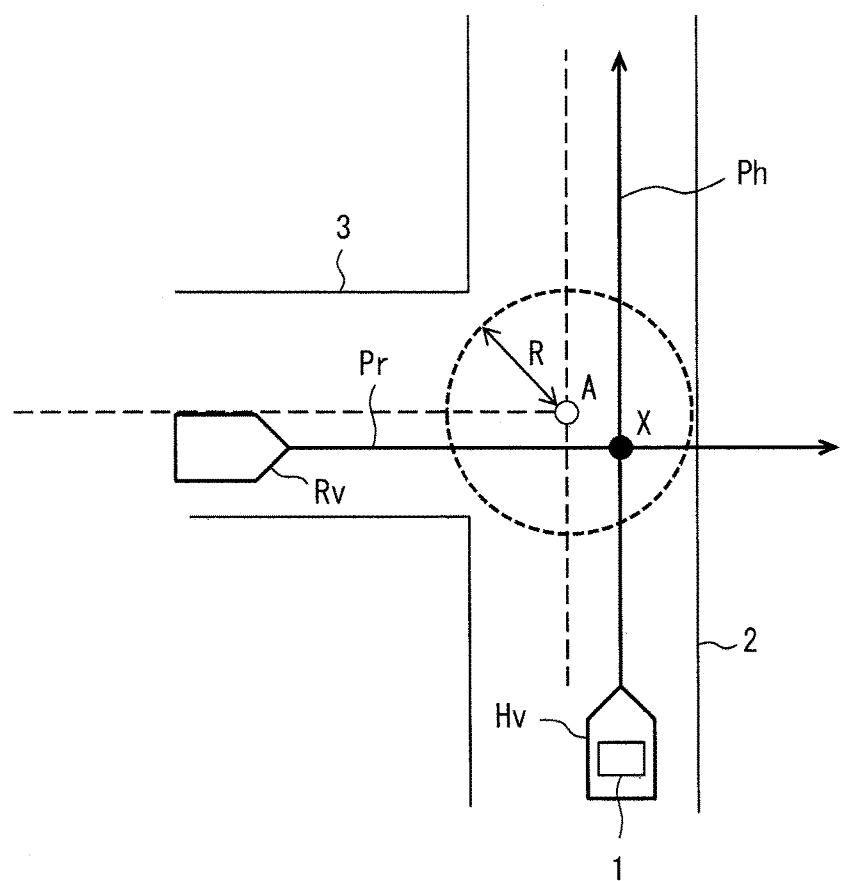
FIG. 4 is an illustration of a cross point of two predicted paths.

In Step S7, it is determined whether a self-vehicle predicted path Ph that is determined by the collision possibility determiner F6 in Step S3 and an other vehicle predicted path Pr specified in Step S6 cross each other. FIG. 4 illustrates an example in which the self-vehicle predicted path Ph and the other vehicle predicted path Pr cross each other. Hv in FIG. 4 is the self-vehicle, and a point X is a point (i.e., a cross point X, hereafter) at which the self-vehicle predicted path Ph and the other vehicle predicted path Pr cross each other.

The road shown by numeral 2 in FIG. 4 is the self-vehicle travel road, and node A represents a node corresponding to the front intersection determined by the travel road information obtainer F7. The road shown by numeral 3 in FIG. 4 is a connected road that is connected to the self-vehicle travel road at the front intersection. FIG. 4 illustrates, as an example, a situation where an object vehicle Rv travels on the connected road 3.

The cross point X is a point at which the path of the self-vehicle Hv and the path of the object vehicle Rv cross each other in case that both of the self-vehicle Hv and the object vehicle Rv maintain the current travel directions.

When the self-vehicle predicted path Ph and the other vehicle predicted path Pr do not form any cross point X, that means that the object vehicle Rv does not have a possibility of collision with the self-vehicle Hv at the moment, i.e., at the current moment in time.

When the determination result in Step S7 indicates that the self-vehicle predicted path Ph and the other vehicle predicted path Pr form a cross point X, the position coordinates of the cross point X are computed, and the process proceeds to Step S8.

On the other hand, when the self-vehicle predicted path Ph and the other vehicle predicted path Pr do not form any cross point X, the flow of the current process ends. Note that when it is determined that the object vehicle Rv does not have a possibility of collision with the self-vehicle Hv, it is equivalent to a support level of the object vehicle Rv set to level 1 (i.e., set to the information non-provision level).

In Step S8, it is determined whether a distance between the cross point X computed in Step S7 and the node A corresponding to the front intersection is less than a predetermined threshold R.

The threshold R in the above may be set as a value that makes it appropriate to determine that the cross point X is within or around (i.e., close to) the front intersection, and a concrete value of the threshold X may be set as a design value.

Then, when the distance between the cross point X and the node A is in less than the threshold R, the process proceeds to Step S9. When the distance between the cross point X and the node A is equal to or greater than the threshold R, the object vehicle Rv is determined as having no collision possibility with the self-vehicle Hv, and the flow of the current process ends.

The above determination of Step S8 is reasoned as follows.

When the self-vehicle Hv and the object vehicle Rv move toward the same intersection (i.e., toward the front intersection), the cross point X is highly possibly positioned close to the node A corresponding to the front intersection. In other words, when the cross point X is distant/far from the node A indicative of the front intersection, it can be considered that the object vehicle Rv is a vehicle that does not pass through the front intersection. Therefore, when the distance between the cross point X and the node A is equal to or greater than the threshold R, it is determined that there is no possibility of collision between the object vehicle Rv and the self-vehicle Hv.

The threshold R may be adjusted to an appropriate value according to the number of lanes of the self-vehicle travel road 2, the number of lanes of the connected road 3, the number of links connected to the front intersection, or the like. It is naturally understood that an area size of an intersection increases as the number of lanes of the self-vehicle travel road 2, the number of lanes of the connected road, or the number of links connected to the front intersection increases. Therefore, the threshold R may be set as a larger value, as the number of lanes of the self-vehicle travel road 2, the number of lanes of the connected road, or the number of roads connected to the front intersection increases.

Note that the determination process in Step S8 may be, in other words, equivalent to a process which determines whether a road on which the object vehicle Rv travels (i.e., an other vehicle travel road) is a connected road connected to the front intersection.

In Step S9, the collision possibility determiner F6 performs a collision risk evaluation process, and the process proceeds to Step S10.

Figure 5:
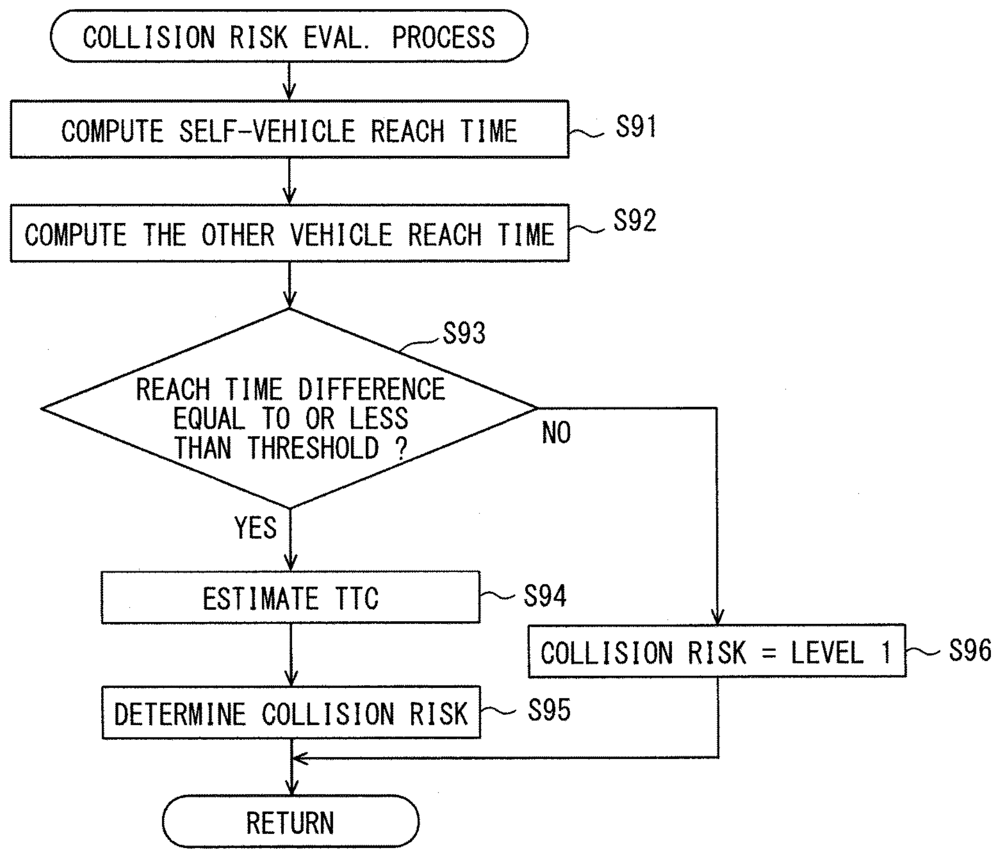
FIG. 5 is a flowchart of a collision risk evaluation process performed by the controller.

The collision risk evaluation process is a process that evaluates a risk of collision between the object vehicle Rv and the self-vehicle Hv. The collision risk evaluation process is described by using a flowchart shown in FIG. 5. Each of the steps shown in FIG. 5 is performed by the collision possibility determiner F6.

First, in Step S91, the collision possibility determiner F6 computes a required time (henceforth, a self-vehicle reach time) for the self-vehicle Hv to reach the cross point X, and the process proceeds to Step S92. In step S91, in order to compute the self-vehicle reach time, the distance from the current position of the self-vehicle Hv to the cross point X is computed first for the computation of the self-vehicle reach time, based on the current position of the self-vehicle Hv and the coordinates of the cross point X. Then, a value computed by dividing the computed distance by the current vehicle speed of the self-vehicle Hv is adopted as the self-vehicle reach time.

In Step S92, a required time (henceforth, an other vehicle reach time) for the object vehicle Rv to reach the cross point X is computed, and the process proceeds to Step S93. The other vehicle reach time is computable by the same procedure as the self-vehicle reach time.

In Step S93, it is determined whether a time difference (henceforth, a reach time difference) between the self-vehicle reach time and the other vehicle reach time is equal to or less than a threshold set up in advance.

The threshold for the reach time difference is a value for determining whether the self-vehicle Hv may possibly collide with the object vehicle Rv when the self-vehicle Hv passes through the cross point X, and the threshold may be, for example, set as several seconds.

Then, when the reach time difference is equal to or less than the threshold, the process proceeds to Step S94.

On the other hand, when the reach time difference is greater than the threshold, the process proceeds to Step S96.

In Step S94, based on the self-vehicle reach time and the other vehicle reach time, a remaining time to the collision with the object vehicle Rv (henceforth, TTC: Time To Collision) is estimated, and the process proceeds to Step S95.

TTC may be estimated/determined as the self-vehicle reach time, or may be estimated/determined as an average value of the self-vehicle reach time and the other vehicle reach time. TTC may also be a smaller one of the self-vehicle reach time and the other vehicle reach time.

In Step S95, based on a value of TTC determined in Step S94, a collision risk level that represents the magnitude of the collision risk is determined.

Here, as an example, the collision risk levels are set as four levels, similarly to the number of the support levels, i.e.; from level 1 to level 4. The level 1 represents the lowest state of the collision risk, and the level 4 represents the highest state of the collision risk.

The level 1 of the collision risk may be described, for example, as having a sufficient remaining time to collision, or having 0% possibility of collision with the object vehicle Rv.

For example; when TTC is equal to or greater than a predetermined first threshold (e.g., 15 seconds), it is determined that the collision risk is level 1, when TTC is less than the first threshold and is equal to or greater than a predetermined second threshold (e.g., 10 seconds), it is determined that the collision risk is level 2. Further, when TTC is less than the second threshold and is equal to or greater than a third threshold (e.g., 5 seconds), it is determined that the collision risk is level 3, and when TTC is less than the third threshold, it is determined that the collision risk is level 4. The concrete value of each of the various thresholds may be arbitrarily designable.

Although the collision risk levels in the present embodiment are determined, as an example, based on the magnitude of TTC, the collision risk level may also be determined in other ways.

For example, as a collision risk determination method in other embodiments, the collision risk level may be determined according to the magnitude of the reach time difference computed in Step S93.

More practically, when the reach time difference is equal to or greater than the predetermined first threshold (e.g., 5 seconds), the collision risk level is determined as level 1, and when the reach time difference is equal to or less than the first threshold and is equal to or greater than a predetermined second threshold (e.g., 3 seconds), the collision risk level is determined as level 2. Further, when the reach time difference is equal to or less than the second threshold and is equal to or greater than a third threshold (e.g., 1.5 seconds), the collision risk level is determined as level 3, and when the reach time difference is equal to or less than the third threshold, the collision risk level is determined as level 4. The concrete value of each of the thresholds may be arbitrarily designed.

In Step S96, the collision risk level is set as level 1, and the flow of the collision risk level estimation process is ended. After ending/completing the collision risk level estimation process, the process proceeds to Step S10 in the flowchart of FIG. 3.

In Step S10, the support processor F9 performs a support level determination process, and the process proceeds to Step S11.

Figure 6:
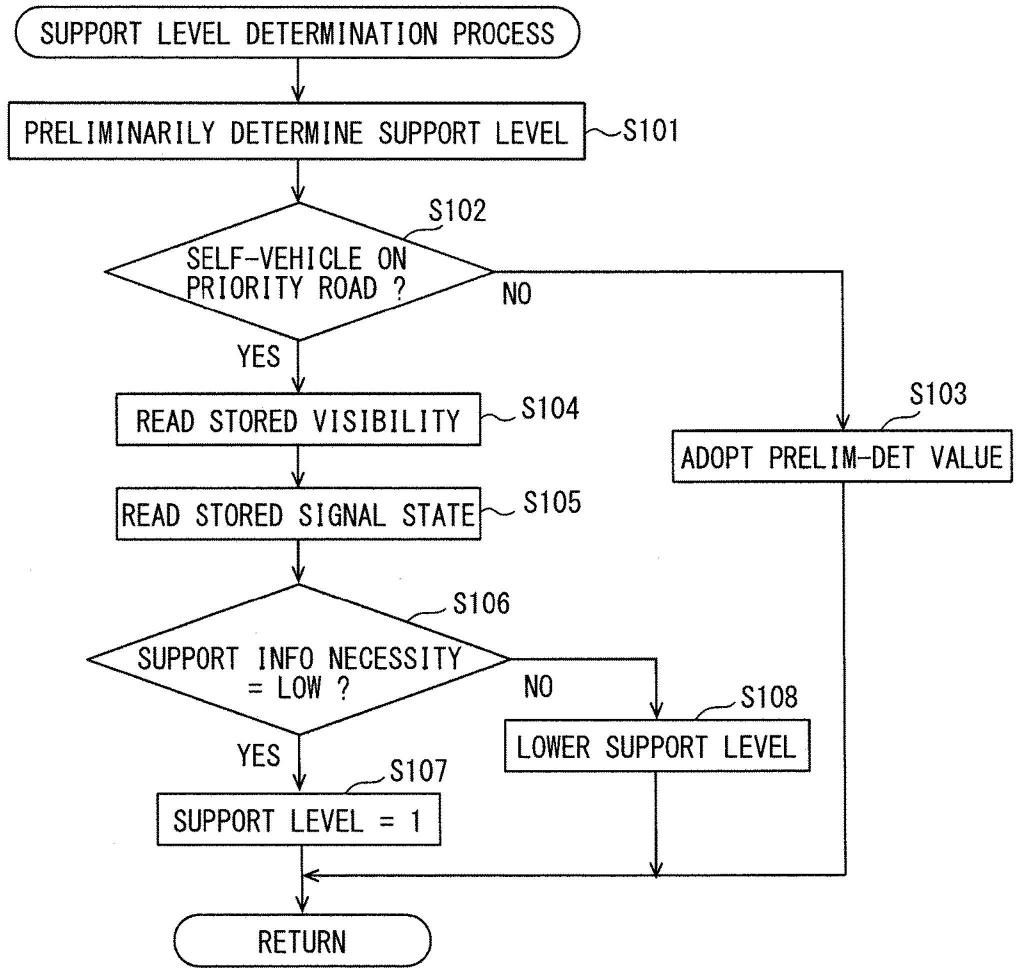
FIG. 6 is a flowchart of a support level determination process performed by the controller.

The support level determination process is a process that determines the support level. The support level determination process is described by using a flowchart shown in FIG. 6. Each of the steps shown in FIG. 6 is performed by the support processor F9 except for Step S102.

First, in Step S101, the support level is preliminary determined as a level corresponding to the collision risk level currently evaluated by the collision possibility determiner F6. For example, when the collision risk level is level 1, the support level is also preliminarily determined as level 1, and when the collision risk level is level 4, the support level is also preliminarily determined as level 4. The other levels are also determined in the same manner.

The support level preliminarily determined in Step S101 is equivalent to the risk-corresponding level in the claims. When the preliminary determination of the support level in Step S101 is complete, the process proceeds to Step S102.

In Step S102, the travel road information obtainer F7 determines whether the self-vehicle travel road is, at the front intersection, set as a priority road over the connected road that is equivalent to the other vehicle travel road based on the node information corresponding to the front intersection.

In the present embodiment, a traffic flow priority order is assigned to each of the roads, for example, and the travel road information obtainer F7 determines whether the self-vehicle travel road is a priority road over the connected road at the front intersection, based on such information assigned to the roads (i.e., based on road priority information).

The determination method for determining whether the self-vehicle travel road is a priority road over the connected road is not limited to the method mentioned above.

As other methods for such determination, the travel road information obtainer F7 may compare, for example, the number of lanes of the connected road with the number of lanes of the self-vehicle travel road, and may determine a greater-number-of-lanes road as a priority road.

Further, based on a class of roads, such as a national road, a prefectural road and the like, which are defined separately according to traffic regulations or the like, a priority road among the self-vehicle travel road and the connected road may be determined. Further, by examining which one of the two roads has a stop sign provided at an intersection, or has a stop line painted on a road surface, a priority road among the two roads may be determined. That is, when the self-vehicle travel road has a stop line painted thereon, it is determined that the self-vehicle travel road is a non-priority road over the connected road. Further, whether a stop line is painted on the road surface or not may be determined based on a map data, or by performing an image recognition process of well-known type for a captured image from an in-vehicle camera.

When the self-vehicle travel road is set as a priority road at the front intersection, an affirmative determination (YES) of Step S102 is performed, and the process proceeds to Step S104.

On the other hand, when the self-vehicle travel road is not set as a priority road at the front intersection, a negative determination (NO) of Step S102 is performed, and the process proceeds to Step S103.

In Step S103, the support level that has been preliminarily determined in Step S101 is adopted as a final value, and the flow is ended.

For example, when the support level has been preliminarily determined as level 2 in Step S101, the support level is now finally determined as level 2, and the flow is ended.

In Step S104, the determination result of the visibility specifier F81 stored in the RAM 132 is read therefrom, and the process proceeds to Step S105.

In Step S105, the determination result of the signal state specifier F82 stored the RAM 132 is read therefrom, and the process proceeds to Step S106.

In Step S106, it is determined whether the need/necessity of output of the support information is relatively low or not is determined in view of the situation around the self-vehicle, i.e., based on the information read in Step S104 and Step S105.

In the present embodiment, for example, support information output necessity is determined as relatively low when (i) the current visibility is good and (ii) the signal device is in a display state that gives a travel right of the intersection to the self-vehicle Hv. Therefore, Step S106 of the present embodiment is a process for determining whether the current visibility is good and the signal device gives a travel right to the self-vehicle Hv.

When the current visibility is good and the signal device gives a travel right to the self-vehicle Hv, an affirmative determination (YES) of Step S106 is performed, and the process proceeds to Step S107.

On the other hand, when the current visibility is not good, or when the signal device is not in a state of giving a travel right to the self-vehicle Hv, a negative determination (NO) of Step S106 is performed, and the process proceeds to Step S108.

In Step S107, the support level is set as level 1 and the flow is ended. In such case, the support information about the object vehicle Rv is no longer output.

Note that the present flow comes to Step S107 when (i) the self-vehicle travel road is a priority road, and (ii) the visibility has been determined as good, and (iii) the travel right of the front intersection is given to the self-vehicle Hv. In such case, the driver of the object vehicle Rv is enabled to correctly recognize the existence of the self-vehicle Hv and the state of the signal device at the intersection, thereby he/she is expected to perform a required drive operation of the object vehicle Rv in order not to hinder the travel of the self-vehicle Hv, e.g., the object vehicle Rv is expected to stop at the intersection or the like. Therefore, by setting the support level as level 1, an output of the unnecessary information is prevented/suppressed.

In Step S108, the support level is either kept unchanged or lowered from a level that has been preliminarily determined in Step S101 within a level range of enabling an output of the support information.

For example, when the support level that has been preliminarily determined in Step S101 is level 4, the level may be set as level 2 or 3. In other words, the support level is suppressed to a level that is equal to or lower than the collision risk level. In the present embodiment, for example, the support level set in Step S108 is a minimum level for outputting the support information, i.e., the support level is set to level 2 in Step S108.

In such manner, when the collision risk level is level 3 or higher, the output of the support information for the driver of the vehicle is performed in a restricted/suppressed manner than the original manner of output. More practically, the information indicative of the existence of the other vehicle is visually provided as the reference information.

Therefore, when the self-vehicle Hv is traveling on a priority road, an annoyance given to the driver due to an "unnecessary" output of the support information is prevented. Further, since the existence of the object vehicle Rv is output in a certain mode/form, e.g., in a visual form as described above, the driver of the self-vehicle Hv traveling on the priority road is prevented from being kept unnoticing the existence of the object vehicle Rv.

Further, in other embodiments, the support level preliminarily determined may be lowered therefrom by a certain number of levels in Step S108 (e.g., by one level). However, when the preliminarily determined support level is the minimum level of outputting the support information (i.e., when the preliminarily determined support level is level 2), the support level is kept unchanged from the preliminarily determined support level, i.e., is kept at the minimum level of outputting the support information.

When the support level determination process mentioned above is complete, the process proceeds to Step S11 of FIG. 3.

In Step S11, the support processor F9 performs a control process according to the support level determined in Step S10. For example, when the support level has been set as level 1, the drive support is not performed. That is, the support information is not output.

Further, when the support level has been set as level 2 or higher level, the support information is output in a manner according to the determined support level. When the process of Step S11 is complete, the flow of the drive support process in FIG. 3 is ended.

<Summary of the Present Embodiment>

According to the above configuration, even in case that the self-vehicle travel road is determined as a priority road over the connected road in Step S102, it is determined whether the necessity of output of the support information is relatively small or not in a subject situation based on the visibility and the state of the signal device (Step S106).

Note that the situation in which the necessity of output of the support information is relatively low is a situation in which (i) the visibility (of the environment) is good and (ii) the driver of the object vehicle Rv can easily recognize the existence of the self-vehicle Hv, or a situation in which no travel right or right of way of an intersection is clearly/unmistakably given to the other vehicle.

In other words, a situation in which the necessity of output of the support information is relatively high is a situation in which (i) the visibility of the environment is not good or compromised, and (ii) the driver of the object vehicle Rv cannot easily recognize the existence of the self-vehicle Hv, or a situation in which a travel right or right of way of an intersection is given to the other vehicle, or the like.

When a travel right or right of way is given to the other vehicle, even when the self-vehicle travel road is defined as a priority road based on a road structure, the self-vehicle Hv should stop, i.e., should not enter the intersection.

Therefore, the need of recognizing existence of the object vehicle Rv is relatively high.

Then, when the situation is determined as having relatively low necessity of output of the support information (Step S106: YES), the support level is set to a level that will not output the support information (Step S107), and, when the situation is determined as having relatively high necessity of output of the support information (Step S106: NO), the support level is set to a level that outputs the support information (Step S108)

That is, when the situation of the nearby field around the self-vehicle is determined as having relatively high necessity of output/provision of the support information, the support information is output even when the self-vehicle travel road is a priority road.

However, the output mode of the support information when the self-vehicle travel road is a priority road is in a more-restricted/suppressed mode than the original output mode of the support information according to the collision risk level.

Based on such a configuration, drive support information is provided for the driver more appropriately according to the situation of the nearby field of the self-vehicle.

Although an example of the embodiment of the present disclosure is described above, the present disclosure is not limited to the above-mentioned embodiment, and various modifications described henceforth are also included in the technical scope of the present disclosure. Further, other than the modifications described below, the present disclosure may also be modifiable in various forms as long as the modifications pertain within the limit of the technical scope.

In the following, the same numerals indicate the same components thereby saving the repetition of the description of the same components. Further, when a part of the configuration is described, description of the rest of the configuration is left to the previously-described configuration of the other embodiments.

[Modification 1]

In the embodiment mentioned above, when the self-vehicle travel road is a priority road (Step S102: YES), the output of the support information is determined in Step S106, based on (i) whether the visibility is good and (ii) whether a travel right of the front intersection is given to the self-vehicle Hv. However, such a configuration may be changed.

When the self-vehicle travel road is a priority road, the output of the support information may be determined based on at least one of (i) whether the visibility is good and (ii) whether a travel right of the front intersection is given to the self-vehicle Hv.

For example, in Step S106 of FIG. 6, the support information output determination may be made solely based on whether the visibility is good in the nearby field of the self-vehicle. In other words, whether a travel right or right of way of the front intersection is given to the self-vehicle Hv needs not be considered/determined as a situation of the nearby field of the self-vehicle Hv.

In such case, the nearby situation obtainer F8 needs not have the signal state specifier F82.

On the contrary, in Step S106 of FIG. 6, the support information output determination may be made solely based on whether a travel right or right of way of the front intersection is given to the self-vehicle Hv. In other words, the situation of whether the visibility of the nearby field of the self-vehicle Hv needs not be considered/determined as a situation of the nearby-field of the self-vehicle.

In such case, the nearby situation obtainer F8 needs not have the visibility specifier F81.

[Modification 2]

In the present embodiment mentioned above, it is determined that the output of the support information is not necessary or the necessity of such output is relatively low and the process proceeds to Step S107 when (i) the current visibility is good and (ii) the signal device gives a travel right or right of way to the self-vehicle Hv. However, such a configuration may be changed.

For example, (i) when the current visibility is good, or (ii) when the signal device in the front intersection is in a display state that gives a travel right to the self-vehicle Hv, the necessity of output of the support information may be determined as relatively low, and the process may proceed to Step S107.

In other words, only when both of the two "whens" are satisfied, i.e., (i) when the current visibility is not good, and (ii) when the signal device is in a display state that does not give a travel right or right of way to the self-vehicle Hv, the necessity of the output of the support information may be determined as relatively high, and the process may proceed to Step S108.

[Modification 3]

Further, the support information may be output even when a negative determination (NO) is made in Step S106. However, the support level determined for such a situation is a level lower than the one that is adopted when an affirmative determination (YES) is made in Step S106.

In other words, even for the same level of the collision risk, the support level may vary, i.e., may be lowered in an order of the following situations (i) to (iii), i.e., (i) when the self-vehicle travel road is a non-priority road, (ii) when the self-vehicle travel road is a priority road and the necessity of output of the support information is relatively high, and (iii) when the self-vehicle travel road is a priority road and the necessity of output of the support information is relatively low.

[Modification 4]

Although the shape of the predicted future path of each of the self-vehicle and the other vehicle is determined as a half-line shape, or as a section shape in the above embodiment, the predicted future path of the vehicles may also have other shapes.

For example, the self-vehicle predicted path Ph may be defined as an arc shape starting from the current position of the self-vehicle Hv and being tangential to a front-rear direction line of the self-vehicle Hv. The front-rear direction line of the self-vehicle Hv in such case is a line indicative of the travel direction of the self-vehicle Hv, and a radius of the arc shape takes a value derived by dividing the vehicle speed by the yaw rate of the self-vehicle Hv. That is, the shape of the self-vehicle predicted path Ph is an arc shape with a turning radius computed from the vehicle speed and the yaw rate of the self-vehicle Hv.

Similarly, the other vehicle predicted path Pr may also be defined as an arc shape having a turning radius that is derived from the vehicle speed and the yaw rate of the other vehicle.

[Modification 5]

The function of the travel road determiner 60 may be provided by the drive support apparatus 10. That is, the drive support apparatus 10 itself may map the position of the self-vehicle Hv on the map, and may identify the self-vehicle travel road.

Further, the in-vehicle system 1 needs not have the map database 61. When the in-vehicle system 1 has an access to, i.e., is communicable with, a server (henceforth, a map distribution server) that is disposed outside of the vehicle and stores road map information, the required map information may be obtained from such a server on demand. Note that the in-vehicle system 1 may wirelessly access to the map distribution server via a wide-area communication network in such case. Further, the map information may also be obtained from a roadside device, or from a nearby vehicle.

[Modification 6]

In the above embodiment, although the travel road information obtainer F7 determines whether the self-vehicle travel road is a priority road over the connected road of the front intersection, such a configuration may be changed.

The travel road information obtainer F7 may identify the other vehicle travel road based on the position information of the other vehicle that is included in the other vehicle information obtained by the near-filed communication controller F3, and the travel road information obtainer F7 may determine whether the self-vehicle travel road is a priority road over the other vehicle travel road based on the identified other vehicle travel road.

According to such a configuration, when there are two or more roads connected to the front intersection, a degree of priority of the self-vehicle travel road is more appropriately determined over the other vehicle travel road on which the object vehicle Rv is traveling.

For example, even when (i) the front intersection has many connected roads (e.g., a five-forked intersection) and (ii) the self-vehicle travel road is not a highest priority road among the connected roads of the front intersection, in case that the self-vehicle travel road has a higher priority assigned thereto than the other vehicle travel road (based on an assumption that there is only one other vehicle), the self-vehicle travel road is determinable as a priority road over the other vehicle travel road. As a result, the support level to the object vehicle Rv is more appropriately set.

Further, when the other vehicle travel road is identified, whether or not the other vehicle travel road joins, i.e., merges with, the self-vehicle travel road is estimatable, i.e., whether or not the other vehicle may possibly collide with the self-vehicle is estimatable, thereby the determination process in Step S8 of FIG. 3 may be omissible.

Note that the other vehicle travel road may be identified by a well-known map matching method, for example. In the present embodiment, the position information indicative of the current position of the other vehicle is provided for the travel road determiner 60, and the travel road determiner 60 identifies/determines the other vehicle travel road. However, such a configuration may be changed.

The travel road information obtainer F7 may identify the other vehicle travel road by performing a map matching process by using the map information of the nearby field and the position information of the other vehicle.

The other vehicle travel road identified by the travel road determiner 60 or by the travel road information obtainer F7 is stored in the RAM 132 in association with the vehicle information of the relevant other vehicle. Note that the other vehicle travel road may be identified sequentially, e.g., road by road, when the other vehicle information is obtained.

In the present embodiment or in the modification 6 mentioned above, the support information is output for supporting the travel of the vehicle in the closest intersection into which the self-vehicle is going to enter (i.e., for supporting the travel in the front intersection), from among the many intersections into which the self-vehicle is going to enter in the future. However, such a configuration may be changed to the one in which the support information of the next intersection next to the front intersection into which the self-vehicle is going to enter may be output, together with the support information of various other intersections into which the self-vehicle may possibly enter. In such case, the intersections to be processed as an object of the relevant processes are not limited to the front intersection. Therefore, in such case, the determination process in Step S8 of FIG. 3 is omitted.

[Modification 7]

When a personal digital assistant/portable terminal brought into a compartment of the self-vehicle Hv by the user is communicably connected to the drive support apparatus 10, the support processor F9 may use a display and/or a speaker of the personal digital assistant/portable terminal as an information providing device. That is, the support information may be output from the display and/or the speaker of the personal digital assistant/portable terminal. The personal digital assistant described above may be a smart phone, a tablet terminal, or the like. The connection between the drive support apparatus 10 and the personal digital assistant/portable terminal may be a wired connection, or may be a wireless connection.

Although the present disclosure has been described in connection with preferred embodiment thereof with reference to the accompanying drawings, it is to be noted that various changes and modifications will become apparent to those skilled in the technique, and such changes, modifications, and summarized schemes are to be understood as being within the scope of the present disclosure as defined by appended claims.

What is claimed is:

1. A drive support apparatus disposed in a subject vehicle cormprising:

a support processor configured to obtain other vehicle information from another vehicle via vehicle-to-vehicle communication and to output the other vehicle information by at least one of a display and a speaker;

a subject vehicle positioner configured to obtain a current position of the subject vehicle based on a navigation signal from a navigation satellite of a satellite navigation system;

a behavior information obtainer configured to continuously obtain a current travel direction of the subject vehicle and to determine behavior information of the subject vehicle based on the obtained current travel direction;

a subject vehicle path specifier configured to predict a future travel path of the subject vehicle based on the current position of the subject vehicle and the behavior information of the subject vehicle;

an other vehicle information obtainer configured to obtain the other vehicle information via a vehicle to vehicle (V2V) communicator, the other vehicle information including a current position and a travel direction of the other vehicle;

an other vehicle path specifier configured to predict a future travel path of the other vehicle based on the other vehicle information;

a collision possibility determiner configured to determine a collision possibility between the subject vehicle and the other vehicle based on the predicted future travel path of the subject vehicle and the predicted future travel path of the other vehicle;

a priority road determiner configured to determine whether a current road on which the subject vehicle is currently travelling has a right of way over an intersecting road intersecting the current road; and a nearby situation obtainer configured to obtain field information based on an output of an environment recognition device, the field information at least one of a visibility state indicative of a visibility of an environment around the subject vehicle, and a display state of a traffic signal in an upcoming intersection relative to the current position of the subject vehicle, wherein the support processor is further configured to determine a support level for outputting support information based on a determination result of the collision possibility determiner, a determination result of the priority road determiner, and the field information, and to output the support information to at least one of the display and the speaker according to the determined support level, wherein the support level is set to one of at least four levels according to a present risk, where an information non-provision level is a level where the support processor does not output information about an existence of the other vehicle;

an information provision level is a level where the support processor outputs an image to the display indicative of the existence of the other vehicle;

an attention calling level is a level where the support processor outputs an image to the display or a reminding sound to the speaker warning of a collision possibility with the other vehicle at the upcoming intersection; and a warning level is a level where the support processor outputs a warning image to the display and a warning sound to the speaker warning of a collision with the other vehicle at the upcoming intersection.

2. The drive support apparatus of claim 1, wherein the support processor is further configured to set the support level to a risk-corresponding level that corresponds to a collision possibility determined by the collision possibility determiner, when the priority road determiner determines that the current road on which the subject vehicle is traveling does not have the right of way.

3. The drive support apparatus of claim 2, wherein the nearby situation obtainer includes a signal state specifier configured to specify the display state of the traffic signal in the upcoming intersection, based on signal device information received by the drive support apparatus that is indicative of the display state of the traffic signal in the upcoming intersection, and wherein the support processor is further configured to set the support level to a level equal to or lower than the risk-corresponding level, when the priority road determiner determines that the current road on which the subject vehicle is traveling has the right of way, and the display state of the traffic signal specified by the signal state specifier indicates that the subject vehicle has the right of way through the upcoming intersection.

4. The drive support apparatus of claim 2, wherein the nearby situation obtainer includes a visibility specifier configured to determine the visibility based on an output of a visibility detection device that outputs index information for a determination of the visibility, and the support processor is further configured to set the support level to a level equal to or lower than the risk-corresponding level, when the priority road determiner determines that the current road on which the subject vehicle is travelling has the right of way, and the visibility specified by the visibility specifier is high.

5. The drive support apparatus of claim 4, wherein the nearby situation obtainer includes a signal state specifier configured to specify the display state of the traffic signal in the upcoming intersection based on signal device information received by the drive support apparatus that is indicative of the display state of the traffic signal in the upcoming intersection, and wherein the support processor is further configured to set the support level to the information non-provision level where the support processor does not output support information providing notification of the other vehicle, when the priority road determiner determines that the the current road on which the subject vehicle is travelling has the right of way, the visibility specified by the visibility specifier is high, and the display state of the traffic signal specified by the signal state specifier indicates that the subject vehicle has the right of way through the upcoming intersection.

6. The drive support apparatus of claim 5, wherein the support processor is further configured to set the support level to a support information output level where the support processor outputs the support information regardless of whether the priority road determiner determines that the current road on which the subject vehicle is traveling has the right of way, when the visibility specifier determines that the visibility is compromised, or the display state of the traffic signal specified by the signal state specifier indicates that the subject vehicle does not have the right of way through the upcoming intersection.

7. The drive support apparatus of claim 5, wherein the support processor is further configured to set the support level to a support information output level where the support processor outputs the support information regardless of whether the priority road determiner determines that the current road on which the subject vehicle is traveling has the right of way, when the visibility specifier determines that the visibility is compromised, and the display state of the traffic signal specified by the signal state specifier indicates that the subject vehicle does not have the right of way through the upcoming intersection.

8. The drive support apparatus of claim 4, wherein the visibility specifier is implemented as at least one of a luminosity sensor that detects a luminosity outside of a vehicle compartment, a headlight sensor that detects a lighting state of a headlight, a foglamp sensor that detects a lighting state of a foglamp, and a camera that captures an image outside of the subject vehicle.

9. The drive support apparatus of claim 3, wherein a roadside device transmits the signal device information, the V2V communicator receives the signal device information transmitted from the roadside device, and wherein the signal state specifier further includes a front camera configured to capture an image of a field in front of the subject vehicle, the signal state specifier further configured to determine the display state of the traffic signal when the front camera captures an image of the traffic signal at the upcoming intersection.

10. The drive support apparatus of claim 1, wherein the behavior information obtainer is further configured to obtain a yaw rate of the subject vehicle from a yaw rate sensor that detects the yaw rate of the, and the subject vehicle path specifier is further configured to predict the future travel path of the subject vehicle based on a current vehicle speed and the yaw rate of the subject vehicle.

11. A drive support apparatus disposed in a subject vehicle comprising:

a controller;

a near-field communicator; and a GNSS receiver, wherein the controller is configured to:

obtain other vehicle information from another vehicle via the near-field communicator, the other vehicle information including a current position and a travel direction of the other vehicle;

obtain a current position of the subject vehicle based on a navigation signal from the GNSS receiver;

obtain a current travel direction of the subject vehicle from a direction sensor in the subject vehicle and to determine behavior information of the subject vehicle based on the obtained current travel direction;

predict a future travel path of the subject vehicle based on the current position of the subject vehicle and the behavior information of the subject vehicle;

predict a future travel path of the other vehicle based on the other vehicle information;

determine a collision possibility between the subject vehicle and the other vehicle based on the predicted future travel path of the subject vehicle and the predicted future travel path of the other vehicle;

determine whether a current road on which the subject vehicle is traveling has a right of way over an intersecting road; and obtain environment information for an environment surrounding the subject vehicle, the environment information including at least one of a visibility level of the environment surrounding the subject vehicle, and a display state of a traffic signal in an oncoming intersection;

determine a collision warning level based on the collision possibility, the right of way, and the environment information; and output the collision warning to at least one of a display device and a speaker in the subject vehicle based on the collision warning level, where the collision warning level is one of an information non-provision level where the controller does not output information about an existence of the other vehicle an information provision level where the controller outputs an image to the display device indicative of the existence of the other vehicle;

an attention calling level where the controller outputs an image to the display device or a reminding sound to the speaker warning of a collision possibility with the other vehicle at the oncoming intersection; and a warning level is a level where the controller outputs a warning image to the display device and a warning sound to the speaker warning of a collision with the other vehicle at the oncoming intersection.

12. A drive support apparatus disposed in a subject vehicle comprising:

a support processor configured to obtain other vehicle information from another vehicle via vehicle-to-vehicle communication and to output the other vehicle information by at least one of a display and a speaker;

a subject vehicle positioner configured to obtain a current position of the subject vehicle based on a navigation signal from a navigation satellite of a satellite navigation system;

a behavior information obtainer configured to continuously obtain a current travel direction of the subject vehicle and to determine behavior information of the subject vehicle based on the obtained current travel direction;

a subject vehicle path specifier configured to predict a future travel path of the subject vehicle based on the current position of the subject vehicle and the behavior information of the subject vehicle;

an other vehicle information obtainer configured to obtain the other vehicle information via a vehicle to vehicle (V2V) communicator, the other vehicle information including a current position and a travel direction of the other vehicle;

an other vehicle path specifier configured to predict a future travel path of the other vehicle based on the other vehicle information;

a collision possibility determiner configured to determine a collision possibility between the subject vehicle and the other vehicle based on the predicted future travel path of the subject vehicle and the predicted future travel path of the other vehicle;

a priority road determiner configured to determine whether a current road on which the subject vehicle is currently travelling has a right of way over an intersecting road intersecting the current road; and a nearby situation obtainer configured to obtain field information based on an output of an environment recognition device, the field information at least one of a visibility state indicative of a visibility of an environment around the subject vehicle, and a display state of a traffic signal in an upcoming intersection relative to the current position of the subject vehicle, wherein:

the support processor is further configured to determine a support level for outputting support information based on a determination result of the collision possibility determiner, a determination result of the priority road determiner, and the field information, and to output the support information to at least one of the display and the speaker according to the determined support level, the support processor is further configured to set the support level to a support information output level where the support processor outputs the support information regardless of whether the priority road determiner determines that the current road on which the subject vehicle is traveling has the right of way, when the nearby situation obtainer determines that the visibility is com promised, and the display state of the traffic signal specified by the nearby situation obtainer indicates that the subject vehicle does not have the right of way through the upcoming intersection.

* * * * *